(12) United States Patent
Ishikawa et al.

(10) Patent No.: US 7,337,200 B2
(45) Date of Patent: Feb. 26, 2008

(54) STORAGE SUB-SYSTEM HAVING EXPANDED DATA READ

(75) Inventors: Atsushi Ishikawa, Minamiashigara (JP); Yoshiko Matsumoto, Minamiashigara (JP); Kenichi Takamoto, Odawara (JP)

(73) Assignee: Hitachi, Ltd., Tokyo (JP)

( * ) Notice: Subject to any disclaimer, the term of this patent is extended or adjusted under 35 U.S.C. 154(b) by 322 days.

(21) Appl. No.: 11/084,137

(22) Filed: Mar. 21, 2005

(65) Prior Publication Data

US 2005/0177765 A1    Aug. 11, 2005

Related U.S. Application Data

(63) Continuation of application No. 10/618,654, filed on Jul. 15, 2003, now Pat. No. 6,954,769, which is a continuation of application No. 10/090,843, filed on Mar. 6, 2002, now Pat. No. 6,611,851, which is a continuation of application No. 09/236,443, filed on Jan. 25, 1999, now Pat. No. 6,374,269.

(30) Foreign Application Priority Data

Jan. 26, 1998  (JP) .................... 10-012457

(51) Int. Cl.
G06F 17/30    (2006.01)

(52) U.S. Cl. ............. 707/205; 711/137; 711/136; 711/113; 707/201; 707/3

(58) Field of Classification Search ............. 711/137, 711/136, 112, 113; 707/1, 3, 202, 201, 205
See application file for complete search history.

(56) References Cited

U.S. PATENT DOCUMENTS

| | | | |
|---|---|---|---|
| 5,455,926 | A | 10/1995 | Keele et al. |
| 5,515,500 | A | 5/1996 | Mizuno et al. |
| 5,708,668 | A | 1/1998 | Styczinski |
| 5,734,859 | A | 3/1998 | Yorimitsu et al. |
| 6,161,103 | A | 12/2000 | Rauer et al. |
| 6,189,004 | B1 | 2/2001 | Rassen et al. |
| 6,212,524 | B1 | 4/2001 | Weissman et al. |
| 6,237,046 | B1 | 5/2001 | Ohmura et al. |
| 6,381,677 | B1 * | 4/2002 | Beardsley et al. .......... 711/137 |
| 6,760,727 | B1 | 7/2004 | Schroeder et al. |
| 6,772,167 | B1 | 8/2004 | Snavely et al. |
| 6,983,283 | B2 * | 1/2006 | Sowizral et al. ........... 707/102 |

FOREIGN PATENT DOCUMENTS

| | | |
|---|---|---|
| JP | A-6-110780 | 4/1994 |
| JP | A-7-110788 | 4/1995 |
| JP | 7-200191 | 8/1995 |
| JP | A-128292 | 5/1997 |

* cited by examiner

*Primary Examiner*—Jean M. Corrielus
(74) *Attorney, Agent, or Firm*—Mattingly, Stanger, Malur & Brundidge, P.C.

(57) ABSTRACT

A storage sub-system employs a staging control information table by which staging of data to be read and redundant data thereof can be executed together to reduce response time in the event of a data read failure. The staging control information table also permits pre-read staging to be executed in the forward, backward or both the forward and backward directions, to reduce response time.

14 Claims, 6 Drawing Sheets

STORAGE SUB-SYSTEM HAVING EXPANDED DATA READ

This is a continuation of U.S. Ser. No. 10/618,654, filed Jul. 15, 2003 now U.S. Pat. No. 6,954,769, which is a continuation of U.S. Ser. No. 10/090,843, filed Mar. 6, 2002, now U.S. Pat. No. 6,611,851, which is a continuation application of U.S. Ser. No. 09/236,443, filed Jan. 25, 1999, now U.S. Pat. No. 6,374,269.

BACKGROUND OF THE INVENTION

1. Field of the Invention

The present invention relates generally to a storage sub-system connected to a host computer, and more particularly to an external storage sub-system having a fast data transfer capability for multiple sequential data reading.

2. Description of the Related Art

In a conventional external storage sub-system that restores data using redundant data, if data read from a data recording medium to a cache memory ("staging") has failed, reliability of the data read can be improved by thereafter staging redundant data and other data required to restore the data, followed by the actual restoring of the data and transfer to a host unit. The entire restoring procedure, however, requires additional time over that of a normal staging procedure.

For example, the response time for a normal staging can be expressed as follows:

> Response time in normal staging=concerned data staging time+data transfer time+other processing time.

By comparison, when staging has failed, the response time, including the restoring of data, may be expressed as follows:

> Response time in failed staging=concerned data staging time+redundant data staging time+data transfer+data restoring time+other processing time.

Therefore, the response time in failed staging is longer than that in normal staging.

A RAID (Redundant Array of Inexpensive Disks) system is a known example of an external storage sub-system which restores data by using redundant data. The conventional RAID system reads data from external storage until the occurrence of a failure, which is determined by a timer timing out (that is, a threshold time period elapses before the end of which the required data has not been read from the external storage). When a failure occurs, the conventional RAID system executes a redundant data restoration process in which an entire "stripe" constituted by redundant data stored in parallel storage units, combined with parity data, is read and used to recreate the data that failed to be read in the primary data read. The RAID system works effectively for recovering data that was not properly read, but additional time is required to perform the data restoration. During the restoration time period, the data read operation is interrupted.

A disk array device which can restore data and store it in a spare recording medium with no processing delay from a host unit by properly recognizing the necessity of restoring the data is disclosed in Japanese Patent Unexamined Publication No. 7-200191. However, this disk array device does not consider to speed up input/output processing when staging has failed.

Another feature of the conventional external storage sub-system is the capability to pre-read data in order to speed up reading of sequential data, such as in video-on-demand (VOD). By transferring data from the low-speed recording medium to the higher-speed cache memory before the host unit demands the data (pre-read processing), data demand from the host unit is performed by simply transferring data from the high-speed cache memory. Therefore, faster processing is possible.

In the conventional external storage sub-system, in the case of a single sequential read demand, pre-read processing is executed when the system judges that the sequential read demand must be received from the host unit, which judgment is made based on the receipt of read demands to successive data or several read demands to the same data area. For multiple sequential read demands, plural information sets required for the sequential decision are provided, and pre-read processing is executed in "multiple mode" to obtain high-speed processing. However, the conventional art has not considered to reduce the processing time required for the sequential decision, or to eliminate the limit on the degree of multiple pre-read processings required by the number of information sets provided for the sequential decision. The limit on the degree of multiple pre-read processings is typically one logic unit, or the size of the memory used for remembering the sequential addresses in an information set.

With the recent emphasis on an information-oriented society, there has been a concurrent increase in the requirement for dealing with multimedia data in storage systems. Particularly, in systems that deal with image and sound data, such as a video-on-demand system, or in the transfer of image/sound data over the Internet, a server typically reads out a large amount of image/sound data from a data storage device, and supplies the data to one or more clients. Delay in the reading of data, however, causes disruption and delay of the image/sound data delivery. Therefore, the storage devices must be optimized to assure minimum response time. However, prior systems have emphasized memory efficiency over response time, particularly in prior RAID systems, due to the prohibitive cost of expanding memory capacity in large-capacity storage sub-systems.

Moreover, when the image/sound data to be transferred is generally sequential data, it is desirable for the data to be transferred as seamlessly as possible, with the capability to transfer the data in either the forward or backward directions, or in both the forward and backward directions. Furthermore, in a network environment, it would be desirable for such systems to permit frequent access by many clients simultaneously, which renders indispensable the execution of many sequential read accesses at the same time.

However, in the conventional external storage sub-system, a single sequential read demand has often been processed by first starting pre-read processing of successive data when several data read demands to successive data or to the same data area have been received, or, in the case of multiple sequential read demands, by providing plural information sets required for the sequential decision, and executing multiple pre-reading. However, the degree of multiple pre-reading is restricted to the number of information sets provided, and performance is deteriorated when the limit is exceeded. Performance is also deteriorated by the amount of overhead required for sequential decision processing, according to the conventional systems.

SUMMARY OF THE INVENTION

It is thus an object of the present invention to provide a storage sub-system which can respond quickly to data read requests, even when the data read has failed, and to improve the processing capability of single or multiple sequential data reading in the forward/backward directions. It is another object of the invention to eliminate restrictions on multiple degrees of sequential reading.

To achieve these and other objects of the invention, a storage sub-system according to the present invention provides a staging control information table which can be used to specify the nature of data read out from a recording medium to a staging area in the cache memory. When a read demand is received, such as from a host unit, the data transfer means of the invention determines the staging area to be transferred from the recording medium to the cache memory according to a specification indicated in the staging control information table, according to a user or internally by a control means. Then, the staging process is executed. The staging control information table indicates whether redundant data required for data restoration is being staged, whether a pre-read staging of successive data is being executed, the direction of pre-reading (forward, backwards, or both), and the data volume of pre-reading. The contents of the staging control information table can be specified and changed through an interface with the host unit, or by a user via an interface built into the storage sub-system or connected to the storage sub-system externally. By this latter means, the user can change the staging area according to the read demand characteristics of the system with which the storage sub-system operates.

When a read demand is received from the host unit, and the staging control information table indicates that redundant data staging is to be executed, the data transfer means executes staging of the redundant data together with the data to be read to the cache memory. Thus, even when the data read has failed, since the data can be restored with the redundant data that has been transferred to the cache memory, the response time can be improved over the conventional method of restoring data when a data read has failed. According to the invention, the response time is improved as follows:

Response time before improvement=data staging time+redundant data staging time+data transfer time+data restoring time+other time;

Response time after improvement=data staging time+data transfer time+data restoring time+ other time.

Thus, the response time can-be reduced so that the only additional time required over the successful data read response time is the data restoring time (that is, the time required for staging redundant data in the prior art is negligible).

Moreover, by instructing the execution of pre-read staging, direction of pre-reading, and volume of pre-read data on the staging control information table, when a read demand is received from the host unit, pre-read staging is executed in which forward/backward successive data to the data to be read (that is, the data immediately after/before the data to be read, in the case of sequential data) is read and stored in the cache memory. By this method, because no pre-read decision is necessary, the overhead required for decision is eliminated; therefore, sequential read processing can be performed more quickly. Further, information for making the pre-read decision is rendered unnecessary, and the prior art restriction degree of pre-reading caused by the number of pre-read information sets is also eliminated. Therefore, pre-read processing can be executed without restriction in multiple degrees.

DETAILED DESCRIPTION OF THE PREFERRED EMBODIMENTS

In the following description, the invention is set forth with respect to restoring data by using redundancy according to the RAID 5 method, in which the data is stored in 5 recording media, although the number of recording media, the method of making the data redundant, the method of data restoration, and the arrangement of data and redundant data are arbitrary and not restricted to the description contained in this paper.

Figure 1:
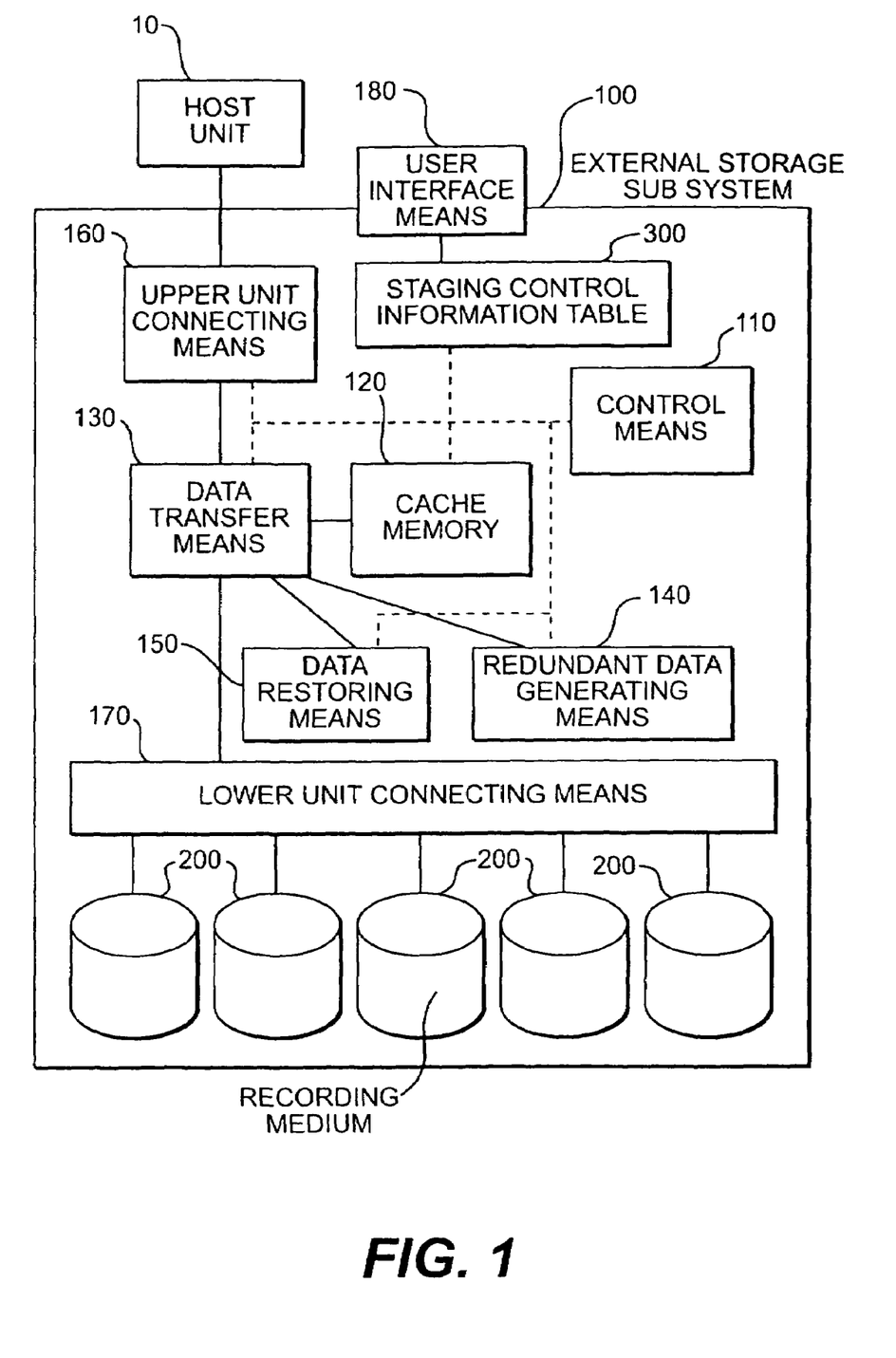
FIG. 1 shows a configuration of an external storage sub-system according to an embodiment of the present invention.

FIG. 1 shows an outline of a configuration for a storage sub-system, according to an embodiment of the present invention. The storage sub-system 100 is connected to a host unit 10, and comprises recording media 200 in which data is stored, control means 110 which controls the entire sub-system, a cache memory 120 for storing data transferred between the recording media 200 and the host unit 10, data transfer means 130 for controlling data transfer in the storage sub-system 100 and to and from the host unit 10, redundant data generating means 140 for generating redundant data, data restoring means 150 for restoring data with the redundant data, upper unit connecting means 160 for controlling the interface with the host unit 10, lower unit connecting means 170 for controlling the interface with the lower recording media, a staging control information table 300 for controlling data transfer from the data recording media 200 to the cache memory 120, and user interface means 180 built into the sub-system or connected externally, for a user to set or change the contents of the staging control information table 300. This configuration is exemplary and illustrative of the invention, but the invention is not limited to the specific configuration shown.

For example, if only fast sequential reading is desired, then the configuration can be altered by removing elements relating to the creation of redundant data and restoration of original data from the redundant data, such as the redundant data generating means 140 and the data restoring means 150.

Figure 2:
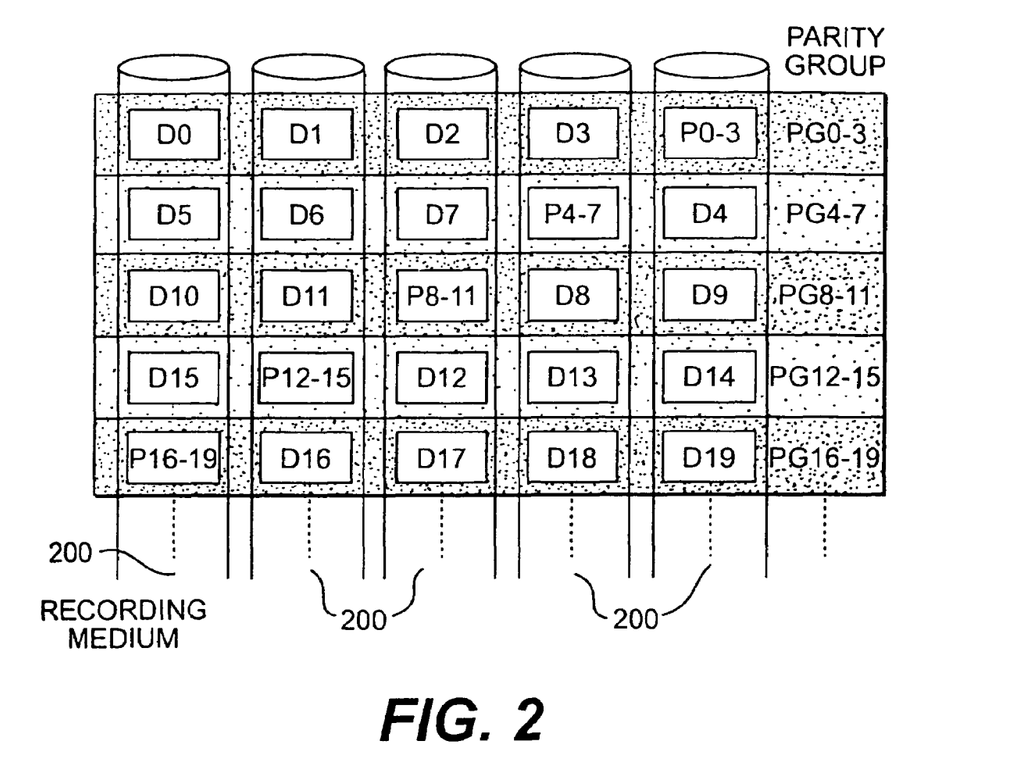
FIG. 2 conceptually shows an example of arrangement of data and redundant data in an external storage sub-system.

FIG. 2 shows a possible arrangement of the data and redundant data stored in the recording media 200. This example is illustrative of the RAID 5 method, in which the data is stored in five recording media.

Data stored in the recording media 200 is divided into units called stripes. The redundant data generating means 140 generates one stripe of redundant data from four data stripes. For example, redundant data stripe P0-3 is generated from data stripes D0-D3, and redundant data stripe P4-7 is generated from data stripes D4-D7. The data stripes and redundant data stripes may be arranged in a circulating mode in the 5 recording media 200.

A group of four data stripes and one redundant data stripe is called a parity group. By using the data restoring means 150, one data stripe can be restored from three other data stripes and one redundant data stripe which belong to the same parity group. For example, a data stripe D2 can be restored from three data stripes D0, D1, D3 and one redundant data stripe P0-3 in the same parity group PG0-3.

Figure 3:
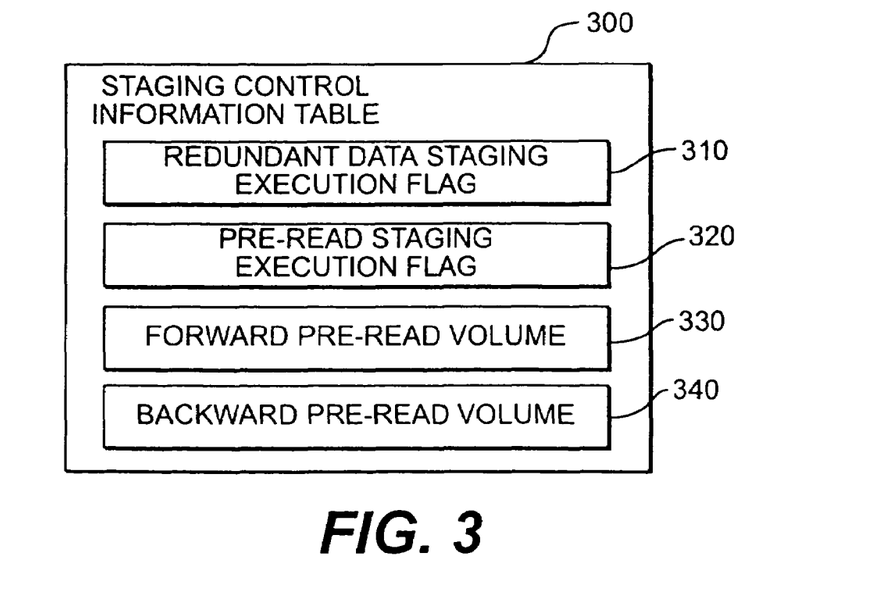
FIG. 3 shows an example of a staging control information table used in an external storage sub-system according to the present invention.

FIG. 3 is a diagram showing the contents of the staging control information table 300. The staging control information table 300 stores information that specifies the staging area to be transferred to the cache memory 120 when a read demand is received from the host unit 10, and comprises redundant data staging execution flag 310, pre-read staging execution flag 320, forward pre-read volume 330, and backward pre-read volume 340. The redundant data staging execution flag 310 is used to control whether the staging of data required for restoring data D10 to be read (in this embodiment, other data and redundant data in the same parity group) is also executed (hereinafter referred to as redundant data staging) in staging the data required by the host unit 10. The redundant data staging execution flag 310 is set either ON or OFF. If set ON, the flag indicates that execution of the redundant data staging should be performed.

The pre-read staging execution flag 320 is used to control whether staging of successive data to the current data D10 is executed (hereinafter referred to as pre-read staging) in staging the data required by the host unit 10 and to control the direction of pre-reading. Four modes of operation (forward pre-reading, backward pre-reading, forward and backward pre-reading, and no pre-reading) can be indicated. The pre-read volume in pre-read staging in the forward direction is set in the forward pre-read volume 330, and the pre-read volume in pre-read staging in the backward direction is set in the backward pre-read volume 340. Both volumes are limited by a maximum value which would be equal to the capacity of the cache memory 120.

The control information table shown in this embodiment is an example of a table constitution that can be employed to embody the present embodiment, but other table constitutions having different arrangements of information and different setting values may be suitable, and fall within the scope of the invention.

The staging control information table 300 can be set through the host unit 10 or through the user interface means 180, whereby a user can specify the staging area for the systems. An example of setting the staging control information table 300 through the host unit 10 is as follows: The host unit issues a SCSI command of MODE SELECT command or a vendor-unique command, which has parameters indicating the contents of the staging control information table. Then, the control means, which has recognized receipt of the command, renews the contents of the staging control information table 300. An example of setting the staging control information table 300 through the user interface means 180 is as follows: The user interface means 180 issues a MODE SELECT command or a vendor-unique command as described above, and the user interface means 180 directly renews the contents of the staging control information table 300. For example, the user interface means 180 may be a set of DIP (dual in-line packed) switches by which the staging control information can be set. Other examples for setting the staging control information table 300 may be employed.

The present embodiment concerns a storage sub-system 100 that has only one staging control information table 300. However, when the storage sub-system comprises plural domains divided internally by RAID groupings, a staging control information table 300 may be provided for each domain, and the staging method may be set or changed individually for each domain. Further, when plural host units 10 are connected to the storage sub-system 100, a separate staging control information table 300 can be provided for each host unit 10, and the staging method can be changed individually for each host unit 10.

Moreover, although the present embodiment has been disclosed with respect to an example in which both redundant data staging and pre-read staging can be executed, the table may be constituted such that only redundant data staging or only pre-read staging can be executed. When only redundant data staging can be executed, the staging control information table 300 contains the redundant data staging execution flag 310, but need not contain the pre-read staging execution flag 320, the forward pre-read volume 330, or the backward pre-read volume 340. Similarly, when only pre-read staging can be executed, the staging control information table 300 contains the pre-read staging execution flag 320, the forward pre-read volume 330, and the backward pre-read volume 340, but need not contain the redundant data staging execution flag 310.

An example of a processing method executed when an input/output demand is issued from the host unit 10 to the sub-system 100 of the present embodiment is explained next with reference to FIGS. 4-7. In this example, processing with respect to an input/output command with respect to a data stripe D10 is explained. For an input/output demand respecting another data stripe, a similar process is executed.

Figure 4:
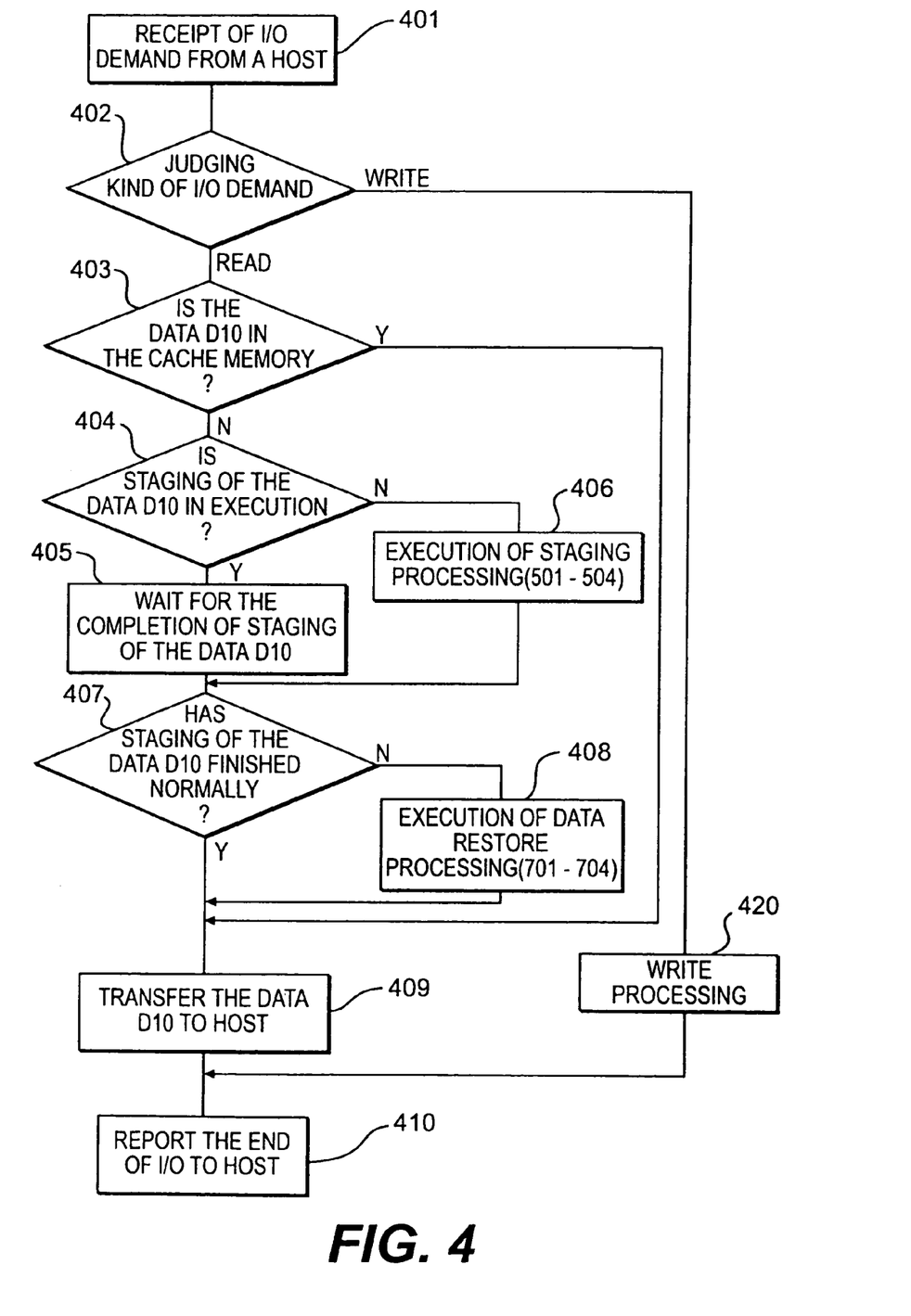
FIG. 4 is a flowchart showing input/output processing in an external storage sub-system according to the present invention.

FIG. 4 is a flowchart showing an outline of the input/output processing according to this embodiment. When a read demand respecting data stripe D10 is received from the host unit (Step 401), the control means 110 judges the kind of input/output demand (Step 402), and if the read demand is recognized, the system verifies whether the data D10 has already been transferred to the cache memory (staged) (Step 403). When the data D10 already exists in the cache memory, 120, the data D10 is transferred to the host unit 10 from the cache memory 120 (Step 409) without execution of further staging processing, etc. (Steps 404-408), and completion of the input/output processing is reported to the host unit 10 (Step 410). Thus, the processing is terminated.

When, however, the data D10 does not exist in the cache memory 120, the system verifies whether staging has already been executed for the data D10 (Step 404). If staging has already begun for the data D10, the system awaits completion of the staging (Step 405). If the staging has not yet been executed, then staging of the data D10 is begun (Step 406).

Upon a completion of the staging process, the system verifies whether the staging of the data D10 has finished normally (Step 407). If the staging has failed, the data D10 is restored by data restoration processing (Step 408). Then, the data D10 is transferred to the host unit 10 from the cache memory 120, and the completion of the input/output process is reported to the host unit 10 (Step 410). Thus, the processing is terminated.

When a write demand is received from the host unit 10 (Step 401), after the write demand is recognized by judging the kind of input/output demand (Step 402), the processing required for the write operation is executed (Step 420). Thereafter, the completion of the input/output processing is reported to the host unit 10 (Step 410).

Figure 5:
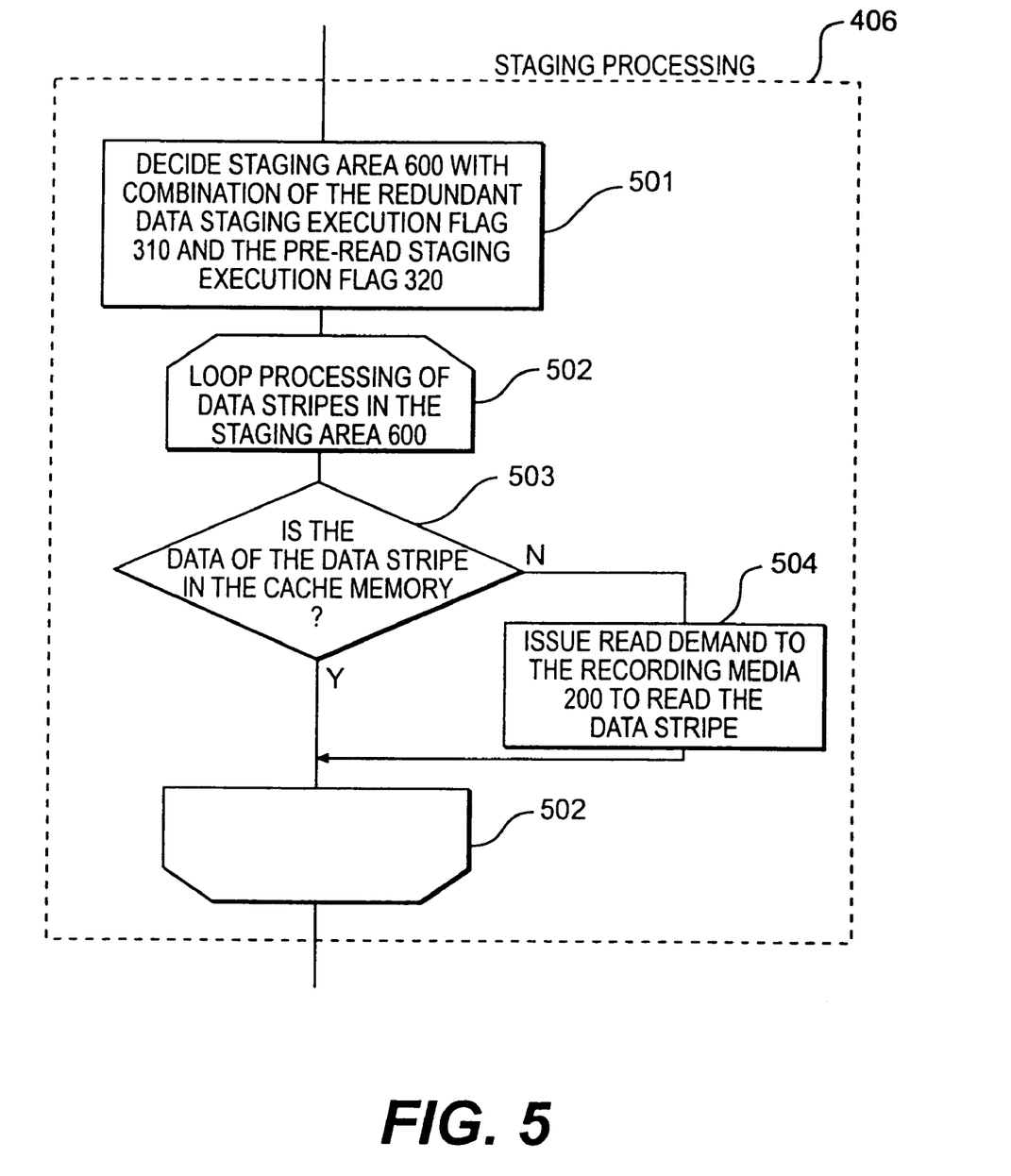
FIG. 5 is a flowchart showing details of staging processing.

FIG. 5 is a flowchart explaining additional details of the staging process (particularly, Step 406).

In the staging process of Step 406, a staging area 600 is first determined according to the control data set in the staging control information table 300 (Step 501). An example relating the staging area 600 with the combination of the redundant data staging execution flag 310 and the pre-read staging execution flag 320 will be explained below with respect to FIG. 6.

Next, loop processing is performed a number of times equal to the number of data stripes in the data staging area 600 (Step 502), and the system verifies whether the data stripe to be stored in the cache memory 120 is already in the cache memory (Step 503). If the data stripe is not in the cache memory 120, a read demand for the data stripe from the recording media 200 is issued (Step 504).

Figure 6:
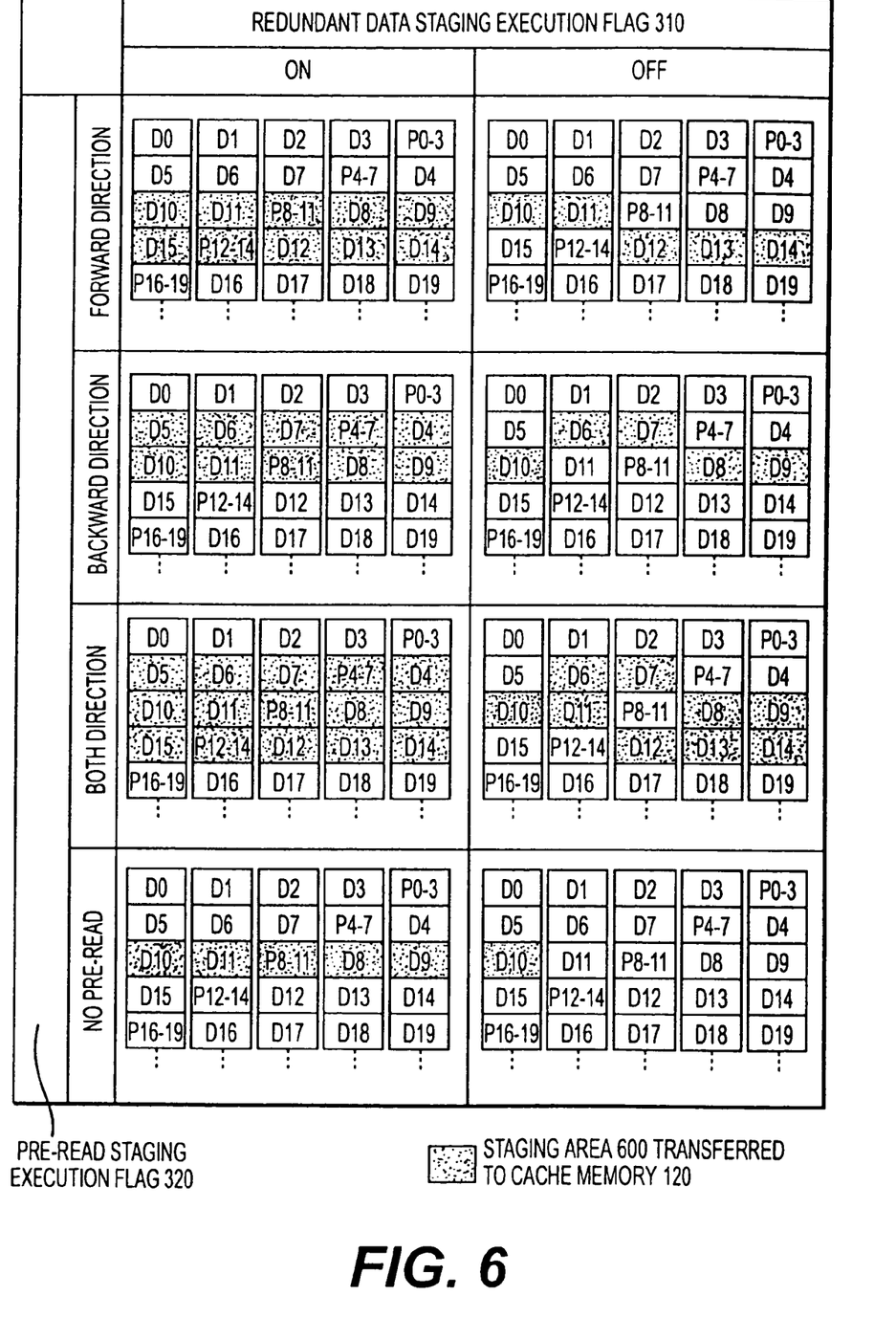
FIG. 6 conceptually shows an example of a relationship between a staging area and control data set on the staging control information table.

FIG. 6 summarizes the relationship between the staging area 600 and the control data set as the redundant data staging execution flag 310 and/or the pre-read staging execution flag 320. In this embodiment, the redundant data staging execution flag 310 is set to either ON or OFF, while the pre-read staging execution flag 320 indicates one of four modes of processing (forward direction, backward direction, forward and backward directions, or no pre-read processing). Pre-reading of four data stripes (for example) is specified in each of the forward pre-read volume 330 and backward pre-read volume 340.

If a different table constitution and different control data are employed, the staging area 600 is decided similarly. Moreover, although the explanation has been given with respect to a read demand for data stripe D10, similar processing is executed for a read demand respecting any other data stripe. Further, any number of data stripes may be indicated in the forward pre-read volume 330.

When the redundant data staging execution flag 310 is set to ON and the pre-read staging execution flag 320 is set to the forward direction, the staging area 600 is the parity group PG8-11 containing the data D10 and the parity group PG12-15, which is the next (forward) successive parity group to PG8-11 (i.e., parity group PG12-15 contains the data that is forward-successive to the data contained in parity group PG8-11). When the redundant data staging execution flag 310 is set to ON and the pre-read staging execution flag 320 is set to the backward direction, the staging area 600 is the parity group PG8-11 containing the data D10 and the parity group PG4-7, which is backward-successive to PG8-11. When the redundant data staging execution flag 310 is set to ON and the pre-read staging execution flag 320 is set to both directions, the staging area 600 is the parity group PG8-11 containing the data D10 and the parity group PG12-15, PG4-7, which are forward- and backward-successive to PG8-11, respectively. When the redundant data staging execution flag 310 is set to ON and the pre-read staging execution flag 320 is set to "no pre-read", the staging area 600 is only the parity group PG8-11 containing the data D10.

When the redundant data execution flag 310 is set to OFF and the pre-read staging execution flag 320 is set to the forward direction, the staging area 600 is the data stripe D10 and data stripes D11-D14, which are forward-successive to the data stripe D10 (where the number of data stripes included in the staging area 600 is indicated by the forward pre-read volume 330). When the redundant data staging execution flag 310 is set to OFF and the pre-read staging execution flag 320 is set to the backward direction, the staging area 600 is the data D10 and the data stripes D9-D6, which are backward-successive to the data D10 (where the number of data stripes is indicated by the backward pre-read volume 340). When the redundant data staging execution flag 310 is set to OFF and the pre-read staging execution flag 320 is set to both directions, the staging area 600 is the data D10, data stripes D11-D14 (which are forward-successive to the data D10, the number of data stripes being indicated by the forward pre-read volume 330), and data stripes D9-D6 (which are backward-successive to the data D10, where the number of data stripes is indicated by the backward pre-read volume 340). When the redundant data staging execution flag 310 is set to OFF and the pre-read staging execution flag 320 is set to "no pre-read", the staging area 600 is only the data D10.

In FIG. 6, the staging area 600 is shown as a section filled with oblique lines for each combination.

Figure 7:
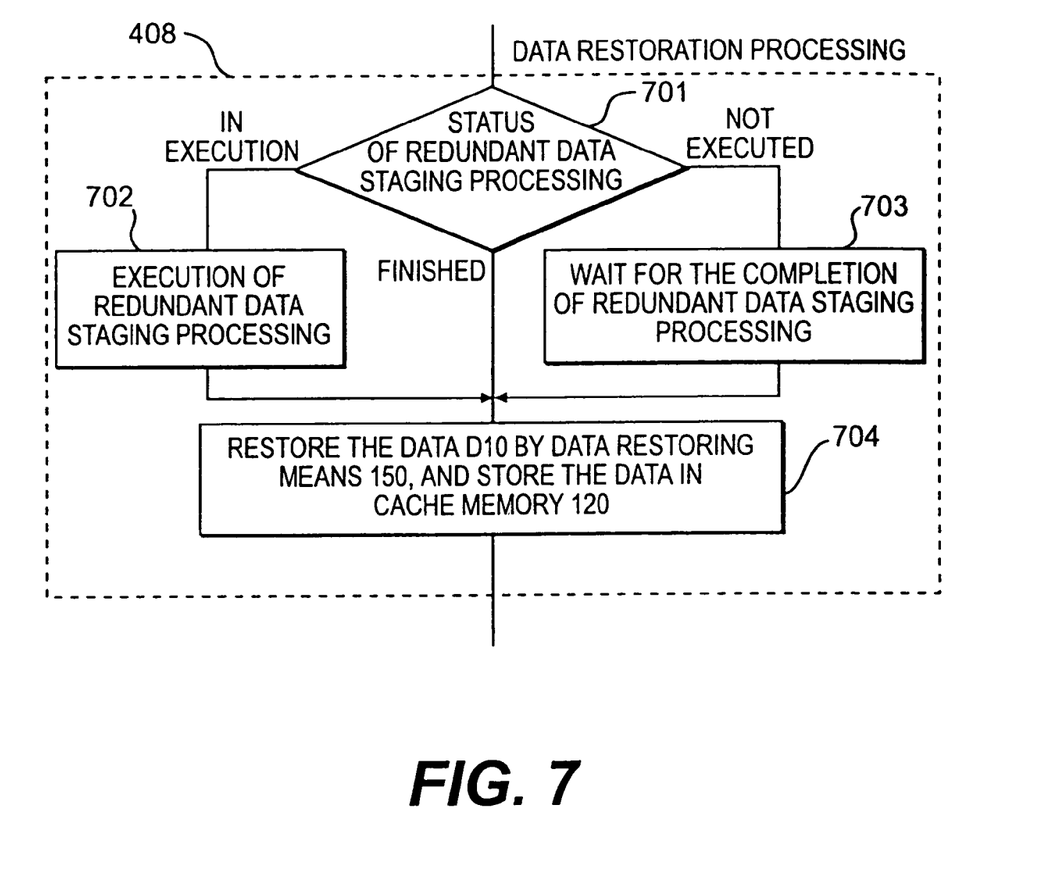
FIG. 7 is a flowchart showing data restoration processing.

FIG. 7 is a flowchart explaining the data restoration processing (Step 408).

In judging whether staging of the data D10 has finished normally (Step 407), if the data read of the data stripe D10 has failed, then data restoration processing for restoring the data D10 from redundant data is required (Step 408). In the data restoration processing, the system verifies the status of the redundant data staging processing (Step 701). When the redundant data staging processing has not been executed yet, the redundant data staging processing is begun.

The redundant data staging processing is performed by transferring the other data stripes (e.g., D8, D9, D11) and the redundant data stripe (e.g., P8-11) that belong to the same parity group PG8-11 that also contains the data D10, to the cache memory 120 (Step 702). When the redundant data staging processing is being executed, but has not yet finished, the system awaits completion of the redundant data staging processing (Step 703). After completion of the redundant data staging processing, the data D10 is restored by the data restoring means 150 and stored in the cache memory 120 (Step 704).

Next, the effect on the response time will be explained when the user specifies execution of redundant data staging.

Conventionally, staging of the redundant data is not executed when the staging of the data D10 is executed. Therefore, no staging of redundant data is begun until a data read failure has occurred. After the system determines that the staging of the data D10 has failed, the conventional method stages the other data stripes and redundant data stripe of the parity group containing the data D10, to begin data restoration processing.

In contrast, according to the present invention, when the user sets ON the redundant data staging execution flag 310 through the host unit or through the user interface means 180, the data D10 and the redundant data are staged at the same time (Step 503 or Step 504); therefore, staging of the redundant data at the time of data restoration processing is not necessary, which enables the data to be restored quickly using the redundant data that already resides in the cache memory 120. Consequently, the response time is quicker according to the present method than the response time of the prior art, because staging from the recording medium (external storage) is very slow in comparison with reading data from the cache memory 120.

The present invention also reduces processing time for sequential read processing by the specification of pre-read data staging.

When the user sets the forward direction in the pre-read data staging execution flag 320 through the host unit 10 or through the user interface means 180, the data D10 and the data next successive to the data D10 (e.g., D11, etc.) are staged at the same time. If the backward direction is set in the pre-read data staging execution flag 320, staging of the data D10 and the next-successive data in the backward direction (e.g., D9, etc.) are staged at the same time. If both directions are set in the pre-read data staging execution flag 320, the data D10 is staged at the same time as the forward-successive and backward-successive data to D10 (e.g., D11, etc., and D9, etc.). Therefore, since the sequential decision employed in the conventional method is not necessary (because the pre-read staging is automatically performed), the processing time required for the sequential decision is eliminated.

Further, when the host unit 10 issues a command for forward/backward sequential read, when the processing for the first read demand is executed, staging of the data area required by second and subsequent read demands is also executed. Therefore, for these second and subsequent read processings, data needs only to be transferred from the cache memory to the host unit, greatly reducing the processing time, because reading data from cache is much faster in comparison with reading data from the external recording media.

User specification of pre-read data staging will be discussed next for multiple sequential reading processing.

According to the present invention, it is not necessary to restrict information according to the number of degrees of sequential read demands. Thus, sequential read processing can be executed without consideration given to the number of sequential read demands. For multiple sequential read demands, staging is executed according to the contents of the staging control information table 300. Here, multiple staging demands can be managed and executed by a queuing function with respect to the recording media 200, or by using a queuing function with respect to the lower unit connecting means 170, according to general input/output demand management.

Conventionally, since pre-read staging is processed based on a sequential decision, multiple pre-read staging processings are limited by the number of tables used to execute the sequential decision. However, according to the present invention, no sequential decision is necessary, and the limitation on the degree of sequential read processing is also eliminated. Thus, many pre-read staging processings can be executed, and many sequential demands can be processed quickly.

By setting up through the host unit 10 or through the user interface means 180, the staging method that is determined to be suitable for the system can be selected from among conventional staging methods, a staging method in which redundant data is read at the same time as data to be read, and pre-read staging of forward, backward, or both forward and backward directions. Moreover, when the storage sub-system 100 comprises plural areas divided according to raid technology or by logical unit, or when plural host units are connected to the storage sub-system 100, by providing a corresponding number of staging control information tables 300 for each area or for each host, a selection (tuning) of the staging method for each divided area or for each host is possible.

Although the invention has been disclosed with respect to preferred embodiments thereof, a person of ordinary skill in the art of concern will readily understand that various modifications can be made. All such modifications that basically rely upon the teachings through which the present invention has advanced the state-of-the-art are properly considered within the spirit and scope of the invention.

We claim:

1. A method for transferring data within a storage system, comprising the steps of:
    receiving a demand to read current data;
    referring to a staging information table that includes information which indicates a direction of pre-reading and a data volume of pre-reading, in response to receiving the read demand;
    staging the current data to a cache memory in accordance with the information referenced in the step of referring to the staging information table; and
    outputting the current data from the cache memory.

2. A method as claimed in claim 1, further comprising the steps of:
    generating redundant data from a plurality of data;
    managing the redundant data and the data from which the redundant data is generated as a parity group; and
    restoring the current data from the redundant data and from the data from which the redundant data is generated in response to a data read failure.

3. A method as claimed in claim 1,
    wherein said staging step is performed so that successive data to said current data is also staged in accordance with said information, when said current data is staged.

4. A method as claimed in claim 3,
    wherein said staging step is performed so that forward successive data to the current data is also staged in accordance with said information, when said current data is staged.

5. A method as claimed in claim 3, wherein said staging step is performed so that backward successive data to the current data is also staged in accordance with said information, when said current data is staged.

6. A method as claimed in claim 3,
    wherein said staging step is performed so that forward and backward successive data to the current data is also staged in accordance with said information, when said current data is staged.

7. A method as claimed in claim 3, further comprising the step, performed by a user, of setting a pre-read staging execution flag in said staging information table, to control staging of said successive data to said cache memory.

8. A method as claimed in claim 3, further comprising the step, performed by an electronic controller, of setting a pre-read staging execution flag in said staging information table in response to a command, to control staging of said successive data to said cache memory.

9. A method as claimed in claim 3,
    wherein said step of referring to the staging information table further refers to a pre-read staging execution flag that indicates whether said successive data to said current data is also staged in said staging step, in response to a command.

10. A method as claimed in claim 9,
    wherein, if said pre-read staging execution flag indicates that said successive data is also staged in said staging step, forward successive data to the current data is staged.

11. A method as claimed in claim 9,
    wherein, if said pre-read staging execution flag indicates that said successive data is also staged in said staging step, backward successive data to the current data is staged.

12. A method as claimed in claim 9,
    wherein, if said pre-read staging execution flag indicates that said successive data is also staged in said staging step, forward and backward successive data to the current data is staged.

13. A method as claimed in claim 9, further comprising the step, performed by a user, of setting the pre-read staging execution flag in said staging information table.

14. A method as claimed in claim 9, further comprising the step, performed by an electronic controller, of setting the pre-read staging execution flag in said staging information table in response to a command.

* * * * *